United States Patent
Wang

(10) Patent No.: US 11,126,596 B2
(45) Date of Patent: *Sep. 21, 2021

(54) BLOCKCHAIN CONSENSUS METHOD AND DEVICE

(71) Applicant: Advanced New Technologies Co., Ltd., Grand Cayman (KY)

(72) Inventor: Shifeng Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,212

(22) Filed: Jul. 6, 2020

(65) Prior Publication Data

US 2020/0334214 A1  Oct. 22, 2020

Related U.S. Application Data

(63) Continuation of application No. 16/507,920, filed on Jul. 10, 2019, now Pat. No. 10,706,023, which is a (Continued)

(30) Foreign Application Priority Data

May 31, 2017  (CN) .......................... 201710405191.3

(51) Int. Cl.
  *G06F 16/00*  (2019.01)
  *G06F 16/182*  (2019.01)
  *G06F 16/11*  (2019.01)

(52) U.S. Cl.
  CPC ........ *G06F 16/1827* (2019.01); *G06F 16/122* (2019.01)

(58) Field of Classification Search
  CPC .... G06F 16/951; G06F 16/1824; G06F 16/20; G06F 16/2471; G06F 16/122;
  (Continued)

(56) References Cited

U.S. PATENT DOCUMENTS 8,656,448 B2  2/2014  Archer et al.
10,706,023 B2  7/2020  Wang
(Continued)

FOREIGN PATENT DOCUMENTS

CN  106157142  11/2016
CN  106296191  1/2017
(Continued)

OTHER PUBLICATIONS

Baliga, "Understanding Blockchain Consensus Models", Persistent Systems Ltd., Apr. 2017, 14 pages.
(Continued)

*Primary Examiner* — Michelle N Owyang
(74) *Attorney, Agent, or Firm* — Fish & Richardson P.C.

(57) ABSTRACT

The present application discloses a blockchain consensus method and device. In the blockchain consensus method, a blockchain node obtains service data on which to perform consensus processing. A service type of the service data is determined. At least one consensus node that provides a consensus service is selected by the blockchain node and from a consensus network based on the service type. The blockchain node sends the service data to the at least one consensus node, so that the at least one consensus node performs consensus processing on the service data.

20 Claims, 3 Drawing Sheets

Related U.S. Application Data continuation of application No. PCT/CN2018/088947, filed on May 30, 2018.

(58) Field of Classification Search
CPC .... G06F 16/1827; G06F 9/5033; G06F 9/544; G06Q 20/223; G06Q 20/405; G06Q 30/06; G06Q 40/02
USPC .................................................. 707/600–899
See application file for complete search history.

(56) References Cited

U.S. PATENT DOCUMENTS

| | | |
|---|---|---|
| 2001/0047411 A1 | 11/2001 | Kurose et al. |
| 2015/0067004 A1 | 3/2015 | Shvachko et al. |
| 2016/0224949 A1 | 8/2016 | Thomas et al. |
| 2016/0300234 A1 | 10/2016 | Moss-Pultz et al. |
| 2017/0149818 A1 | 5/2017 | Hillis et al. |
| 2017/0149819 A1 | 5/2017 | Androulaki et al. |
| 2017/0235645 A1 | 8/2017 | Theimer et al. |
| 2018/0101560 A1 | 4/2018 | Christidis et al. |
| 2018/0123882 A1 | 5/2018 | Anderson et al. |
| 2018/0159818 A1 | 6/2018 | Speight |
| 2018/0205555 A1 | 7/2018 | Watanabe et al. |
| 2018/0211718 A1* | 7/2018 | Heath .................. A01K 29/005 |
| 2018/0255090 A1* | 9/2018 | Kozloski ................ H04L 67/02 |
| 2018/0270065 A1* | 9/2018 | Brown .................. H04L 9/0643 |
| 2018/0285869 A1 | 10/2018 | Li |
| 2018/0287997 A1 | 10/2018 | Li et al. |
| 2018/0314809 A1 | 11/2018 | Mintz et al. |
| 2019/0180266 A1* | 6/2019 | Sidhu .................. G06Q 20/3829 |
| 2019/0289031 A1 | 9/2019 | Kozloski et al. |
| 2019/0312875 A1 | 10/2019 | Sardesai et al. |
| 2019/0332586 A1 | 10/2019 | Wang |

FOREIGN PATENT DOCUMENTS

| | | |
|---|---|---|
| CN | 106445711 | 2/2017 |
| CN | 106534085 | 3/2017 |
| CN | 106603698 | 4/2017 |
| CN | 106656974 | 5/2017 |
| CN | 106682907 | 5/2017 |
| CN | 107450981 | 12/2017 |
| CN | 108717460 | 10/2018 |
| JP | 2007074207 | 3/2002 |
| KR | 101727525 | 4/2017 |
| TW | M542178 | 5/2017 |
| WO | WO 2016161496 | 10/2016 |
| WO | WO 2017010455 | 1/2017 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Decker et al., "Bitcoin Meets Strong Consistency", Cornell University, Feb. 2015, 10 pages.

European Extended Search Report in European Patent Application No. 18809316.5, dated Dec. 10, 2019, 7 Pages.

Luu et al., "SCP: A Computationally-Scalable Byzantine Consensus Protocol for Blockchains",National University of Singapore, Dec. 2015, 16 pages.

Nakamoto, "Bitcoin: A Peer-to-Peer Electronic Cash System," www.bitcoin.org, 2005, 9 pages.

PCT International Preliminary Report on Patentability in International Application No. PCT/CN2018/088947, dated Dec. 3. 2019. 9 pages (with English translation).

PCT International Search Report and Written Opinion in International Application No. PCT/CN2018/088947, dated Aug. 22, 2018, 9 pages (with partial English translation).

Vukolic, "The Quest for Scalable Blockchain Fabric: Proof-of-Work vs. BFT Replication", International Workshop on Open Problems in Network Security, Oct. 2015. 14 pages.

\* cited by examiner

BLOCKCHAIN CONSENSUS METHOD AND DEVICE

CROSS-REFERENCE TO RELATED APPLICATIONS

This application is a continuation of U.S. patent application Ser. No. 16/507,920, filed Jul. 10, 2019, which is a continuation of PCT Application No. PCT/CN2018/088947, filed on May 30, 2018, which claims priority to Chinese Patent Application No. 201710405191.3, filed on May 31, 2017, and each application is hereby incorporated by reference in their entirety.

TECHNICAL FIELD

The present application relates to the field of Internet information processing technologies and the field of computer technologies, and in particular, to a blockchain consensus method and device.

BACKGROUND

The blockchain technology, also referred to as a distributed ledger technology, is a distributed Internet database technology. A network constructed based on the blockchain technology can be referred to as a blockchain network. The blockchain network includes network nodes (which can also be referred to as blockchain nodes, and are referred to as nodes for short below). Each node corresponds to at least one blockchain, and each blockchain includes at least one block. The blockchain network (or the blockchain technology) features decentralization, transparency, temper resistance, and trustworthiness. Based on these features, the blockchain technology is applied in more and more fields.

The process of recording service data into a blockchain (that is, storing service data in a blockchain network) includes the following three phases: a handling phase, a consensus phase, and a storage phase. The handling phase can be understood as follows: A certain blockchain node in the blockchain network receives service data to be recorded into a blockchain, and the blockchain node handles the service data. The consensus phase can be understood as follows: After the blockchain node handles the service data, another blockchain node in the blockchain network needs to participate in consensus processing on the service data. The storage phase begins after a consensus is reached on the service data. The storage phase can be understood as follows: The blockchain node records the service data that a consensus is reached on into the blockchain.

Among the three phases included in the process of recording service data into a blockchain, the consensus phase needs participation of another blockchain node in the blockchain network. The research found that when consensus processing is being performed on service data, the duration of the consensus processing is lengthened as more blockchain nodes participate in the consensus processing. Consequently, the efficiency of the consensus processing performed on the service data is reduced.

SUMMARY

In view of this, implementations of the present application provide a blockchain consensus method and device to alleviate the problem of low consensus processing efficiency in the existing technology.

The following technical solutions are adopted in the implementations of the present application.

An implementation of the present application provides a blockchain consensus method, including the following: obtaining, by a blockchain node, service data to be performed a consensus procedure on, and determining a service type of the service data; selecting, by the blockchain node from a consensus network based on the service type, at least one consensus node that provides a consensus service; and sending, by the blockchain node, the service data to the selected consensus node so that the selected consensus node performs consensus processing on the service data.

An implementation of the present application further provides a blockchain consensus device, including an acquisition unit, a selection unit, and a sending unit, where the acquisition unit obtains service data to be performed a consensus procedure on, and determines a service type of the service data; the selection unit selects, from a consensus network based on the service type, at least one consensus node that provides a consensus service; and the sending unit sends the service data to the selected consensus node so that the selected consensus node performs consensus processing on the service data.

An implementation of the present application further provides a blockchain consensus device, including a memory and at least one processor, where the memory stores a program, and the at least one processor is configured to perform the following steps: obtaining service data to be performed a consensus procedure on, and determining a service type of the service data; selecting, from a consensus network based on the service type, at least one consensus node that provides a consensus service; and sending the service data to the selected consensus node so that the selected consensus node performs consensus processing on the service data.

At least one of the previously described technical solutions adopted in the implementations of the present application can achieve the following beneficial effects: in the implementations of the present application, the consensus node that provides the consensus service can be selected based on the service type of the service data to be performed a consensus procedure on, and the selected consensus node performs the consensus processing on the service data. In this way, some consensus nodes are selected from the consensus network to perform consensus processing for different services, thereby alleviating the problem of long consensus processing duration caused by a large quantity of consensus nodes that participate in the consensus processing. It can not only shorten the consensus processing duration, but also ensure the legitimacy of the consensus processing result, thereby effectively improving the service data processing efficiency of the blockchain network.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF IMPLEMENTATIONS

Figure 1:
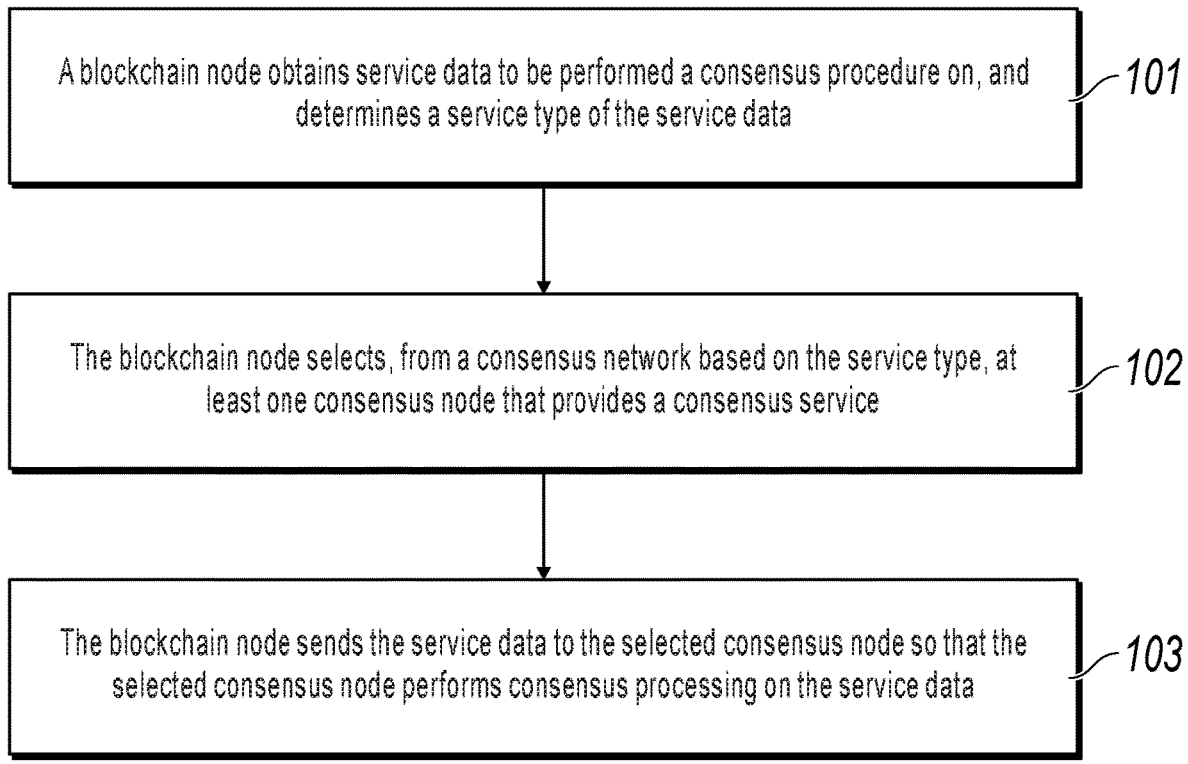
FIG. 1 is a schematic flowchart illustrating a blockchain consensus method, according to an implementation of the present application.

To make the objectives, technical solutions, and advantages of the present application clearer, the following clearly and comprehensively describes the technical solutions of the present application with reference to specific implementations and accompanying drawings of the present application. Apparently, the described implementations are merely some rather than all of the implementations of the present application. All other implementations obtained by a person of ordinary skill in the art based on the implementations of the present application without creative efforts shall fall within the protection scope of the present application.

The technical solutions provided in the implementations of the present application are described in detail below with reference to the accompanying drawings.

A blockchain network and a consensus network that are described in the implementations of the present application can be the same network. In other words, a blockchain node in the network can also be referred to as a consensus node. A node that handles service data in the network can be referred to as a service handling node and initiates consensus processing on the service data. The network includes a plurality of nodes in addition to the node. These nodes can be referred to as consensus nodes if these nodes participate in the consensus processing on the service data. In addition, these nodes can also function as service handling nodes. For example, the blockchain network includes five nodes (node 1, node 2, node 3, node 4, and node 5), and each node can function as both a service handling node and a consensus node. If node 1 handles service data, node 1 functions as a service handling node, and node 2, node 3, node 4, and node 5 function as consensus nodes for the service data and participate in consensus processing on the service data.

The blockchain network described in the implementations of the present application can include a consensus network. In this case, a consensus node included in the consensus network can perform consensus processing on a consensus request initiated by a blockchain node in the blockchain network. For example, the blockchain network includes five nodes (node 1, node 2, node 3, node 4, and node 5), where node 2, node 4, and node 5 are consensus nodes in the consensus network. In this case, node 2, node 4, and node 5 can perform consensus processing on a consensus request initiated by node 1 or node 3. Node 1 and node 3 here can function as nodes for handling service data and request the consensus nodes in the consensus network to perform consensus processing on the handled service data. That is, the consensus nodes may not participate in service data handling.

In the implementations of the present application, whether a consensus result is stored on a consensus node is not limited and can be determined based on actual demand. Both a case in which the consensus result is stored on the consensus node and a case in which the consensus result is not stored on the consensus node fall within the protection scope of the implementations of the present application.

FIG. 1 is a schematic flowchart illustrating a blockchain consensus method, according to an implementation of the present application. The method can be described as follows.

Step 101: A blockchain node obtains service data to be performed a consensus procedure on, and determines a service type of the service data.

In the present implementation of the present application, the blockchain node can function as a node for handling service data, a node for initiating consensus processing, or a primary node for the present consensus processing, which is not limited here.

If the blockchain node functions as the node for handling service data, the blockchain node can retrieve some service data from handled and locally stored service data as the service data to be performed a consensus procedure on, to facilitate consensus processing subsequently initiated on the retrieved service data.

If the blockchain node functions as the primary node for the present consensus processing instead of the node for handling service data, the blockchain node can retrieve some service data from a service data resource pool to be performed a consensus procedure on, and use the retrieved service data as the service data to be performed a consensus procedure on, to facilitate consensus processing subsequently initiated on the retrieved service data.

After obtaining the service data to be performed a consensus procedure on, the blockchain node determines a service that generates the service data to be performed a consensus procedure on, and further determines the service type corresponding to the service data to be performed a consensus procedure on.

Services can be classified into different types based on different service functions. For example, a service can be of an order type (a service type corresponding to service data generated in an order generation phase is the order type) or a payment type (a service type corresponding to service data that includes payment information is the payment type). Services can be alternatively classified based on different service content. For example, a service can be of a card issuing type (a service type corresponding to service data that includes card issuing information is the card issuing type) or a transaction type (a service type corresponding to service data that includes transaction information is the transaction type). A classification principle for service types is not limited here.

The blockchain node determines a service type corresponding to each piece of service data after obtaining the service data to be performed a consensus procedure on. In practice, because coverage of some service types overlaps, when determining the service type corresponding to each piece of service data, the blockchain node can determine a service type with broader coverage in a cluster way (or another way, which is not limited here) as the service type corresponding to the obtained service data to be performed a consensus procedure on.

For example, service types corresponding to the obtained service data to be performed a consensus procedure on include the order type and the payment type. Because both the service data of the order type and the service data of the payment type belong to the transaction type based on service content, the service type corresponding to the service data to be performed a consensus procedure on is determined as the transaction type.

It is worthwhile to note that one or more service types can be determined here. If a plurality of service types are determined, the plurality of service types can correspond to one consensus algorithm in a subsequent step. Or the plurality of service types can correspond to a plurality of consensus algorithms, but one consensus algorithm that is applicable to the plurality of service types can be determined from the plurality of consensus algorithms.

Step 102: The blockchain node selects, from a consensus network based on the service type, at least one consensus node that provides a consensus service.

In the present implementation of the present application, the blockchain node first determines, based on a predetermined mapping relationship between a service type and a consensus policy, a consensus policy corresponding to the service type of the received service data, where the consensus policy includes a consensus algorithm.

The consensus policy is a method of performing consensus processing on service data generated by a certain service or some services. To be specific, the consensus policy specifies a consensus algorithm used to perform consensus processing on service data that is generated by a service corresponding to a specified service type.

The consensus policy here can include the used consensus algorithm and can further include a consensus mechanism. The consensus mechanism here includes whether consensus nodes in the consensus network need to perform global consensus processing. If yes, the consensus mechanism included in the consensus policy is a global consensus mechanism. If no, the consensus mechanism included in the consensus policy is a local consensus mechanism.

The consensus algorithm included in the consensus policy in the present implementation of the present application includes but is not limited to the following: the Proof of Work (PoW) algorithm, the Proof of Stake (PoS) algorithm, the Delegated Proof of Stake (DPoS) algorithm, the Practical Byzantine Tault Tolerance (PBFT) algorithm, and the Delegated Byzantine Fault Tolerance (DBFT) algorithm.

It is worthwhile to note that different service types can correspond to the same consensus policy or different consensus policies. In the present implementation of the present application, different consensus algorithms can be used for service data of different service types to ensure the service data processing efficiency. Consensus algorithms that are relatively applicable and that can ensure the processing efficiency can be determined for different service types based on features of different service types and operating principles, advantages, and disadvantages of different consensus algorithms. A mapping relationship can be established between a service type and a consensus algorithm.

For example, the PBFT algorithm can be used to perform consensus processing on service data of the order type that includes a relatively large amount of data and is invulnerable to attack, and the PoW algorithm can be used to perform consensus processing on service data of the payment type that is vulnerable to attack. The consensus algorithm for a service type is not limited here.

In addition, the blockchain node selects, from the consensus network based on the consensus algorithm, the at least one consensus node that provides the consensus service.

The blockchain node determines, based on the consensus algorithm, a quantity of consensus nodes that are to participate in the consensus processing, where the quantity satisfies a predetermined quantity of the consensus algorithm, and selects the quantity of consensus nodes from the consensus network.

Because different consensus algorithms have different operating principles, the quantity of consensus nodes that are allowed to participate in the consensus processing varies depending on the consensus algorithm. For example, for the PoW algorithm, all nodes in a network need to function as consensus nodes that participate in one round of consensus processing. For another example, for the PBFT algorithm, a minimum of four nodes need to function as consensus nodes that participate in one round of consensus processing.

Therefore, in the present implementation of the present application, the consensus nodes that are to participate in the consensus processing can be selected based on the quantity of consensus nodes that is needed by the minimum voting set of the consensus algorithm.

Alternatively, in the present implementation of the present application, the quantity of the consensus nodes that are to participate in the consensus processing can be determined based on a specified algorithm (such as a randomized algorithm).

For example, the quantity of the consensus nodes that are to participate in the consensus processing is determined in the following way:

R=Node number % the quantity of nodes. That is, R can be obtained by calculating the remainder when the node number is divided by the quantity of nodes.

R is the determined quantity of the consensus nodes that are to participate in the consensus processing. The node number is the number of the blockchain node that is described in step 101 and that obtains the service data to be performed a consensus procedure on. The quantity of nodes is the quantity of blockchain nodes included in the blockchain network (or the quantity of consensus nodes included in the consensus network).

It is worthwhile to note that each blockchain node in the blockchain network can be numbered in advance. In this way, the number of the blockchain node that is described in step 101 and that obtains the service data to be performed a consensus procedure on can be quickly determined. If the quantity of the consensus nodes that are to participate in the consensus processing is determined by using the previous equation, the determined quantity of the consensus nodes that are to participate in the consensus processing varies for service data of the same service type depending on the number of the node for handling the service data. Or nodes for handling service data of different service types can be determined in advance. In other words, a node for handling service data of a service type is a designated blockchain node in the blockchain network. In this case, the quantity of consensus nodes participating in the consensus processing as determined above can be the same for the service data of the same service type.

In addition, the node number in the equation can be alternatively a service type number. Numbers of different service types can be determined in advance. In this case, for the service data of the same service type, after the service type corresponding to the service data to be performed a consensus procedure on is determined in step 101, the service type number corresponding to the service type can be further determined, and then the quantity of the consensus nodes that are to participate in the consensus processing can be determined based on the previous equation.

After the quantity of the consensus nodes that are to participate in the consensus processing is determined, the quantity of consensus nodes can be selected from the consensus network in the following way:

The blockchain node randomly selects the quantity of consensus nodes from the consensus network; or the blockchain node selects the quantity of consensus nodes from the consensus network based on load of consensus nodes in the consensus network.

For example, the quantity of the consensus nodes that are to participate in the consensus processing is determined as four. In this case, four consensus nodes can be randomly selected from the consensus network, and the four selected consensus nodes provide the consensus service for the present consensus processing. Alternatively, to improve the service data processing efficiency, load statuses of the consensus nodes in the consensus network can be determined, the consensus nodes in the consensus network are sequenced based on the load statuses, the last four consensus nodes in the sequence are selected from the consensus network, and the four selected consensus nodes provide the consensus service for the present consensus processing.

In addition, in the present implementation of the present application, at least one consensus algorithm can be configured for each consensus node in the consensus network. In this case, the blockchain node determines a consensus algorithm supported by each consensus node in the consensus network after determining the quantity of the consensus nodes that are to participate in the consensus processing.

The blockchain node determines, based on the consensus algorithm supported by each consensus node, consensus nodes that support the consensus algorithm included in the consensus policy, and selects the quantity of consensus nodes from the determined consensus nodes.

Preferably, in the present implementation of the present application, after the blockchain node selects the consensus node, especially when the consensus mechanism included in the determined consensus policy is the local consensus mechanism, to ensure the legitimacy of the present consensus result, the blockchain node broadcasts the selected consensus node to other blockchain nodes so that the other blockchain nodes vote on whether to agree that the selected consensus node provides the consensus service. If the blockchain node receives consensus reaching messages from the other blockchain nodes, it indicates that the other blockchain nodes agree that the selected consensus node is to participate in the consensus processing, and means that a consensus result obtained by the consensus node is considered to be legitimate. Otherwise, the blockchain node needs to perform the operation of selecting a consensus node again.

Step 103: The blockchain node sends the service data to the selected consensus node so that the consensus node performs consensus processing on the service data.

The blockchain node broadcasts the service data to the selected consensus node so that the consensus node performs consensus processing on the service data.

Preferably, in the present implementation of the present application, the blockchain node sends the service data to the selected consensus node when receiving the consensus reaching messages sent by the other blockchain nodes.

When the consensus processing on the service data completes, and the blockchain node receives a consensus result, sent by the selected consensus node, for the service data, if determining that the consensus result for the service data needs to be globally shared, the blockchain node sends the consensus result for the service data to a consensus node that does not participate in the consensus processing in the consensus network, and stores the consensus result for the service data to a blockchain.

When receiving the consensus result, sent by the selected consensus node, for the service data, the blockchain node stores the consensus result for the service data to a blockchain if determining that the consensus result for the service data does not need to be globally shared.

It is worthwhile to note that the blockchain node can determine, based on a data sharing mechanism included in the consensus policy determined in step 102, whether the consensus result for the service data needs to be globally shared. If the data sharing mechanism is a global sharing mechanism, the blockchain node determines that the consensus result for the service data needs to be globally shared. If the data sharing mechanism is a local sharing mechanism, the blockchain node determines that the consensus result for the service data does not need to be globally shared.

That is, the consensus policy determined in step 102 includes the data sharing mechanism in addition to the consensus algorithm and the consensus mechanism. The data sharing mechanism corresponding to service data whose consensus mechanism is the global consensus mechanism is the global sharing mechanism. The data sharing mechanism corresponding to service data whose consensus mechanism is the local consensus mechanism can be the global sharing mechanism or the local sharing mechanism. Details are omitted here.

According to the technical solution provided in the present implementation of the present application, the consensus node that provides the consensus service can be selected based on the service type of the service data to be performed a consensus procedure on, and the selected consensus node performs the consensus processing on the service data. In this way, some consensus nodes are selected from the consensus network to perform consensus processing for different services, thereby alleviating the problem of long consensus processing duration caused by a large quantity of consensus nodes that participate in the consensus processing. It can not only shorten the consensus processing duration, but also ensure the legitimacy of the consensus processing result, thereby effectively improving the service data processing efficiency of the blockchain network.

Figure 2:
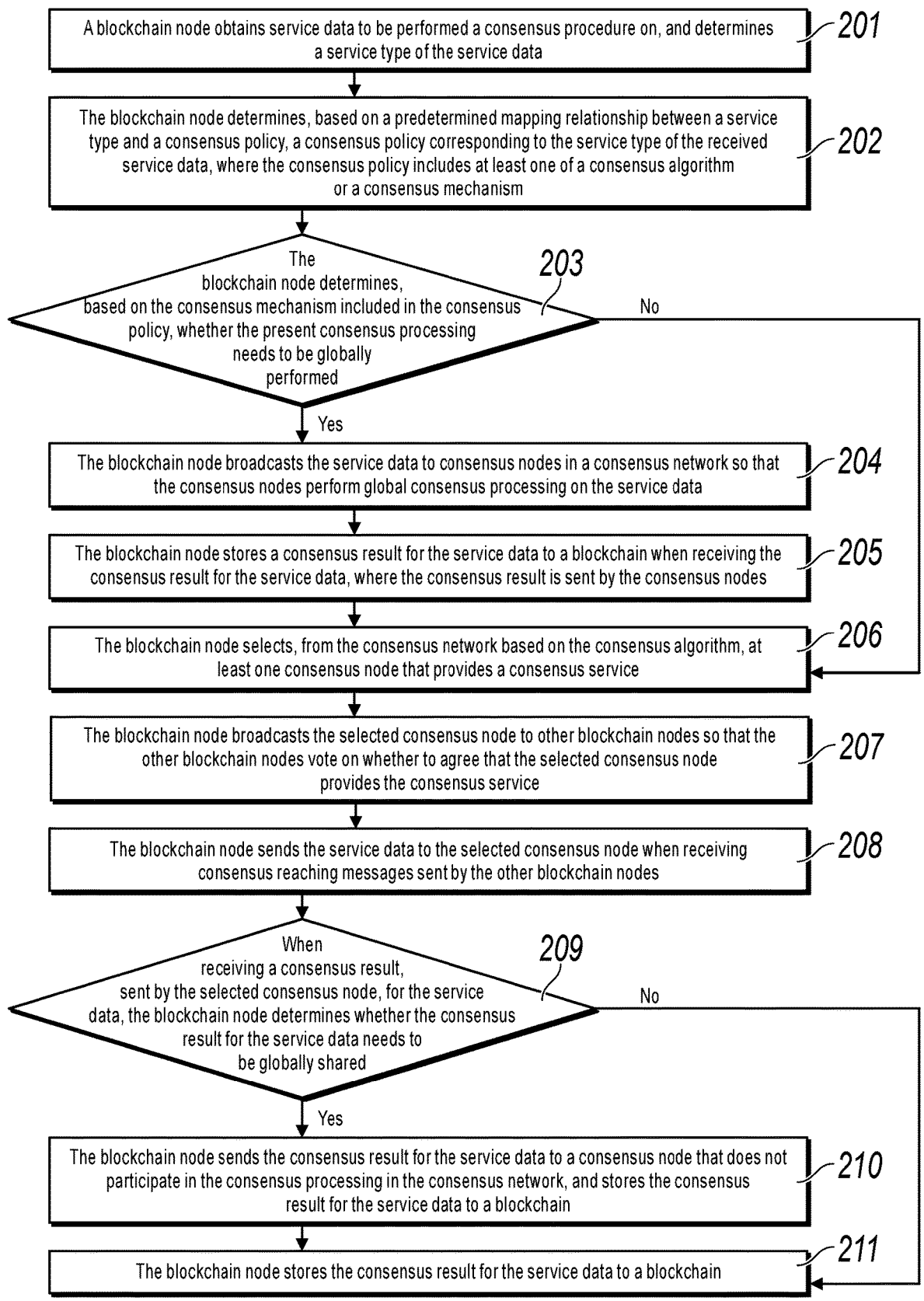
FIG. 2 is a schematic flowchart illustrating a blockchain consensus method, according to an implementation of the present application.

FIG. 2 is a schematic flowchart illustrating a blockchain consensus method, according to an implementation of the present application. The method can be described as follows.

Step 201: A blockchain node obtains service data to be performed a consensus procedure on, and determines a service type of the service data.

An implementation of the present step is the same as or similar to the implementation of step 101. Details are omitted here.

Step 202: The blockchain node determines, based on a predetermined mapping relationship between a service type and a consensus policy, a consensus policy corresponding to the service type of the received service data, where the consensus policy includes at least one of a consensus algorithm or a consensus mechanism.

Step 203: The blockchain node determines, based on the consensus mechanism included in the consensus policy, whether the present consensus processing needs to be globally performed, if yes, performs step 204, and if no, performs step 206.

Step 204: The blockchain node broadcasts the service data to consensus nodes in a consensus network so that the consensus nodes perform global consensus processing on the service data.

Step 205: The blockchain node stores a consensus result for the service data to a blockchain when receiving the consensus result for the service data, where the consensus result is sent by the consensus nodes.

Step 206: The blockchain node selects, from a consensus network based on the consensus algorithm, at least one consensus node that provides a consensus service.

Step 207: The blockchain node broadcasts the selected consensus node to other blockchain nodes so that the other blockchain nodes vote on whether to agree that the selected consensus node provides the consensus service.

Step 208: The blockchain node sends the service data to the selected consensus node when receiving consensus reaching messages sent by the other blockchain nodes.

Step 209: When receiving a consensus result, sent by the selected consensus node, for the service data, the blockchain node determines whether the consensus result for the service data needs to be globally shared, if yes, performs step 210, and if no, performs step 211.

Step 210: The blockchain node sends the consensus result for the service data to a consensus node that does not participate in the consensus processing in the consensus network, and stores the consensus result for the service data to a blockchain.

Step 211: The blockchain node stores the consensus result for the service data to a blockchain.

Figure 3:
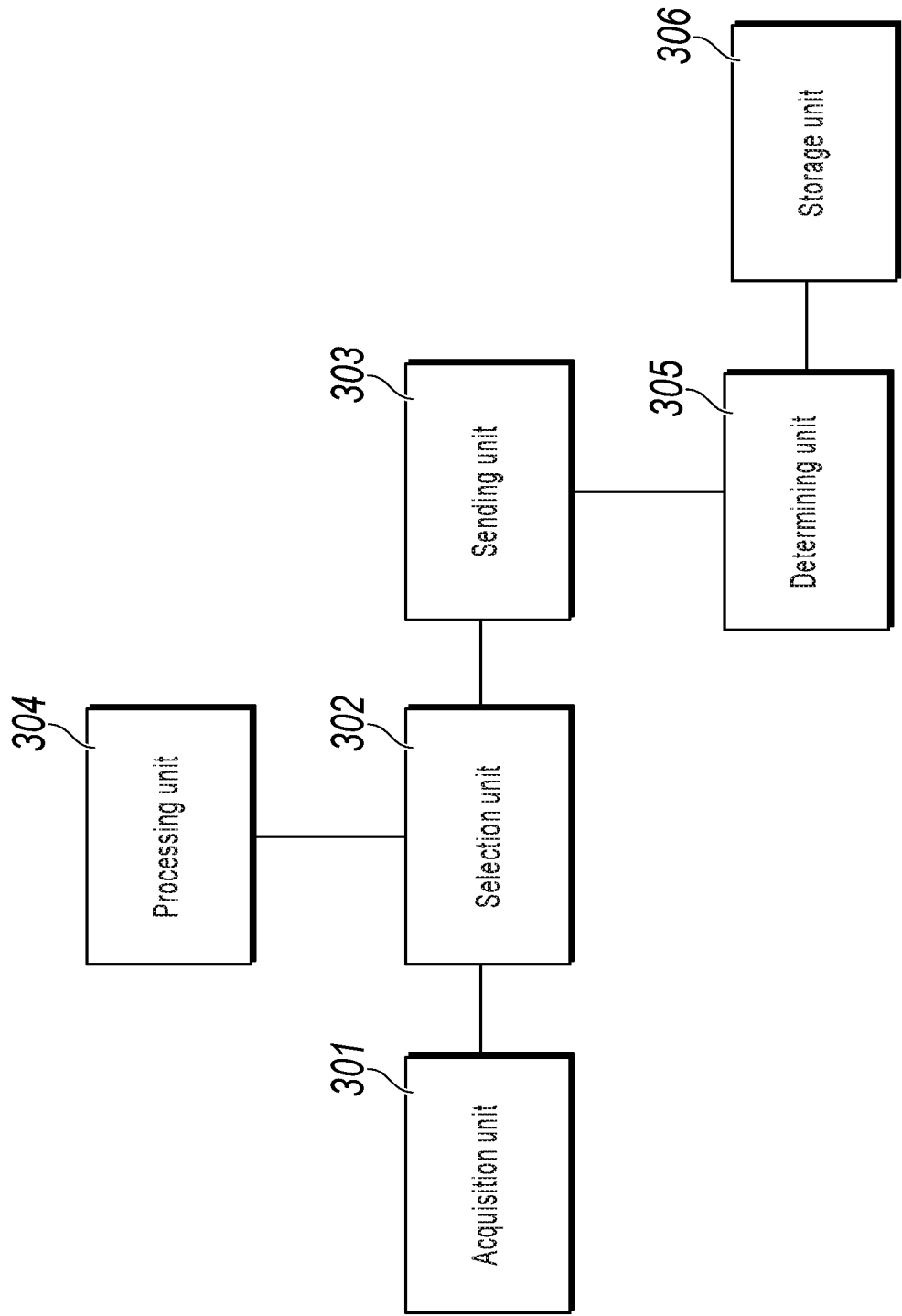
FIG. 3 is a schematic structural diagram illustrating a blockchain consensus device, according to an implementation of the present application.

FIG. 3 is a schematic structural diagram illustrating a blockchain consensus device, according to an implementation of the present application. The blockchain consensus device includes an acquisition unit 301, a selection unit 302, and a sending unit 303.

The acquisition unit 301 obtains service data to be performed a consensus procedure on, and determines a service type of the service data.

The selection unit 302 selects, from a consensus network based on the service type, at least one consensus node that provides a consensus service.

The sending unit 303 sends the service data to the selected consensus node so that the selected consensus node performs consensus processing on the service data.

In another implementation of the present application, the selection unit 302 selects, from the consensus network based on the service type, the at least one consensus node that provides the consensus service, including the following: determining, based on a predetermined mapping relationship between a service type and a consensus policy, a consensus policy corresponding to the service type of the received service data, where the consensus policy includes a consensus algorithm; and selecting, from the consensus network based on the consensus algorithm, the at least one consensus node that provides the consensus service.

In another implementation of the present application, the selection unit 302 selects, from the consensus network based on the consensus algorithm, the at least one consensus node that provides the consensus service, including the following: determining, based on the consensus algorithm, a quantity of consensus nodes that are to participate in the consensus processing, where the quantity satisfies a predetermined quantity of the consensus algorithm; and selecting the quantity of consensus nodes from the consensus network.

In another implementation of the present application, the selection unit 302 selects the quantity of consensus nodes from the consensus network, including the following: randomly selecting the quantity of consensus nodes from the consensus network; or selecting the quantity of consensus nodes from the consensus network based on load of consensus nodes in the consensus network.

In another implementation of the present application, the selection unit 302 selects the quantity of consensus nodes from the consensus network, including the following: determining a consensus algorithm supported by each consensus node in the consensus network; and determining, based on the consensus algorithm supported by each consensus node, consensus nodes that support the consensus algorithm included in the consensus policy, and selecting the quantity of consensus nodes from the determined consensus nodes.

In another implementation of the present application, the blockchain consensus device further includes a processing unit 304.

The processing unit 304 broadcasts the selected consensus node to other blockchain nodes before the service data is sent to the selected consensus node, so that the other blockchain nodes vote on whether to agree that the selected consensus node provides the consensus service.

The sending unit 303 sends the service data to the selected consensus node, including the following: sending the service data to the selected consensus node when receiving consensus reaching messages sent by the other blockchain nodes.

In another implementation of the present application, the blockchain consensus device further includes a determining unit 305.

When a consensus result, sent by the selected consensus node, for the service data is received, if determining that the consensus result for the service data needs to be globally shared, the determining unit 305 sends the consensus result for the service data to a consensus node that does not participate in the consensus processing in the consensus network, and stores the consensus result for the service data to a blockchain.

In another implementation of the present application, the blockchain consensus device further includes a storage unit 306.

When a consensus result, sent by the selected consensus node, for the service data is received, the storage unit 306 stores the consensus result for the service data to a blockchain if it is determined that the consensus result for the service data does not need to be globally shared.

It is worthwhile to note that the blockchain consensus processing device provided in the present implementation of the present application can be implemented by using hardware or software. It is not limited here. The blockchain consensus processing device can select, based on the service type of the service data to be performed a consensus procedure on, the consensus node that provides the consensus service, and the selected consensus node performs the consensus processing on the service data. In this way, some consensus nodes are selected from the consensus network to perform consensus processing for different services, thereby alleviating the problem of long consensus processing duration caused by a large quantity of consensus nodes that participate in the consensus processing. It can not only shorten the consensus processing duration, but also ensure the legitimacy of the consensus processing result, thereby effectively improving the service data processing efficiency of the blockchain network.

An implementation of the present application further provides a blockchain consensus device, including a memory and at least one processor, where the memory stores a program, and the at least one processor is configured to perform the following steps: obtaining service data to be performed a consensus procedure on, and determining a service type of the service data; selecting, from a consensus network based on the service type, at least one consensus node that provides a consensus service; and sending the service data to the selected consensus node so that the selected consensus node performs consensus processing on the service data.

For other content implemented by the program, reference can be made to the content described in the previous implementation. Details are omitted here.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present application is implemented, a function of each unit can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a calculating device includes one or more processors (CPU), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible by the calculating device. Based on the definition in the present specification, the computer readable medium does not include transitory computer readable media (transitory media) such as a modulated data signal and carrier.

It is worthwhile to further note that, the terms "include", "comprise", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For same or similar parts of the implementations, references can be made to the implementations. Each implementation focuses on a difference from other implementations. Particularly, a system implementation is basically similar to a method implementation, and therefore, is described briefly. For related parts, refer to related descriptions in the method implementation.

The previous implementations are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A blockchain consensus method comprising:
   receiving, by a blockchain node of a blockchain network, a request of a service, wherein the request indicates service data, on which to perform the service, wherein the service comprises performance of a consensus process, and wherein the blockchain network comprises a plurality of blockchain nodes;
   in response to the request of the service, retrieving, by the blockchain node, the service data from locally stored service data, on which to perform the consensus process;
   determining, by the blockchain node, classes of the service based on a service function of the service that was requested or based on a service content of the service that was requested, wherein the service function comprises a function to be performed using the service data and the service content defines an item processed by the service function;
   determining, by the blockchain node, one or more service types of the service data corresponding to the classes of the service;
   mapping, by the blockchain node, the one or more service types of the service data to one or more consensus algorithms based on a vulnerability of the service data, wherein the vulnerability of the service data indicates whether the service data is vulnerable or invulnerable to an attack;
   identifying, by the blockchain node, based on operating principles of the one or more consensus algorithms, a minimum number of consensus nodes to perform the consensus process, wherein the minimum number of consensus nodes comprises a determined percentage of available consensus nodes within the blockchain network designated to process the one or more service types of the service data;
   performing, by the blockchain node, a selection of consensus nodes from the blockchain network to perform the consensus process, wherein the selection of consensus nodes is based on the minimum number of consensus nodes and a respective load of each consensus node of consensus nodes in the blockchain network; and
   sending, by the blockchain node, the service data to the consensus nodes that were selected to perform the consensus process on the service data.

2. The blockchain consensus method of claim 1, wherein consensus nodes that were selected comprise a portion of available consensus nodes within the blockchain network that is smaller than the available consensus nodes within the blockchain network for the service data that is invulnerable to the attack.

3. The blockchain consensus method of claim 1, wherein performing, by the blockchain node, a selection of consensus nodes comprises:
   determining a quantity of consensus nodes to participate in the consensus process of the service data, wherein the quantity of consensus nodes satisfies a predetermined quantity; and
   selecting, by the blockchain node, the quantity of consensus nodes from the blockchain network.

4. The blockchain consensus method of claim 1, wherein the respective load of each consensus node of consensus nodes in the blockchain network is included in a sequence of load statuses.

5. The blockchain consensus method of claim 3, further comprising:
   determining, by the blockchain node, a consensus algorithm supported by each consensus node in the blockchain network;
   determining, by the blockchain node and based on the consensus algorithm supported by each consensus node, consensus nodes that support the consensus algorithm that comprises a consensus policy; and selecting a quantity of the consensus nodes from the consensus nodes that support the consensus algorithm.

6. The blockchain consensus method of claim 1, further comprising:

broadcasting the minimum number of consensus nodes to other blockchain nodes before the service data is sent to the consensus nodes that were selected, wherein the other blockchain nodes vote on whether to agree that the consensus nodes that were selected provide the service; and wherein sending further comprises:

sending the service data to the consensus nodes that were selected in response to receiving consensus reaching messages sent by the other blockchain nodes.

7. The blockchain consensus method of claim 6, wherein the method further comprises:

in response to receiving a consensus result and in response to determining a need to globally share the consensus result, sending, by the blockchain node, the consensus result to a consensus node that is independent from the consensus process in the blockchain network, and storing the consensus result for the service data to a blockchain.

8. The blockchain consensus method of claim 6, wherein the method further comprises:

in response to receiving a consensus result sent by the minimum number of consensus nodes for the service data, storing, by the blockchain node, the consensus result to a blockchain in response to determining a need to not globally share the consensus result.

9. A non-transitory, computer-readable medium storing one or more instructions executable by a computer system comprising one or more processors to perform operations comprising:

receiving, by a blockchain node of a blockchain network, a request of a service, wherein the request indicates service data, on which to perform the service, wherein the service comprises performance of a consensus process, and wherein the blockchain network comprises a plurality of blockchain nodes;

in response to the request of the service, retrieving, by the blockchain node, the service data from locally stored service data, on which to perform the consensus process;

determining, by the blockchain node, classes of the service based on a service function of the service that was requested or based on a service content of the service that was requested, wherein the service function comprises a function to be performed using the service data and the service content defines an item processed by the service function;

determining, by the blockchain node, one or more service types of the service data corresponding to the classes of the service;

mapping, by the blockchain node, the one or more service types of the service data to one or more consensus algorithms based on a vulnerability of the service data, wherein the vulnerability of the service data indicates whether the service data is vulnerable or invulnerable to an attack;

identifying, by the blockchain node, based on operating principles of the one or more consensus algorithms, a minimum number of consensus nodes to perform the consensus process, wherein the minimum number of consensus nodes comprises a determined percentage of available consensus nodes within the blockchain network designated to process the one or more service types of the service data;

performing, by the blockchain node, a selection of consensus nodes from the blockchain network to perform the consensus process, wherein the selection of consensus nodes is based on the minimum number of consensus nodes and a respective load of each consensus node of consensus nodes in the blockchain network; and sending, by the blockchain node, the service data to the consensus nodes that were selected to perform the consensus process on the service data.

10. The non-transitory, computer-readable medium of claim 9, wherein consensus nodes that were selected comprise a portion of available consensus nodes within the blockchain network that is smaller than the available consensus nodes within the blockchain network for the service data that is invulnerable to the attack.

11. The non-transitory, computer-readable medium of claim 9, wherein performing, by the blockchain node, a selection of consensus nodes comprises:

determining a quantity of consensus nodes to participate in the consensus process of the service data, wherein the quantity of consensus nodes satisfies a predetermined quantity; and selecting, by the blockchain node, a quantity of consensus nodes from the blockchain network.

12. The non-transitory, computer-readable medium of claim 9, wherein the respective load of each consensus node of consensus nodes in the blockchain network is included in a sequence of load statuses.

13. The non-transitory, computer-readable medium of claim 11, wherein the operations further comprise:

determining a consensus algorithm supported by each consensus node in the blockchain network;

determining, based on the consensus algorithm supported by each consensus node, consensus nodes that support the consensus algorithm comprised in a consensus policy; and selecting a quantity of the consensus nodes from the consensus nodes that support the consensus algorithm.

14. The non-transitory, computer-readable medium of claim 9, wherein the operations further comprise:

broadcasting the minimum number of consensus nodes to other blockchain nodes before the service data is sent to the consensus nodes that were selected, wherein the other blockchain nodes vote on whether to agree that the consensus nodes that were selected provide the service; and wherein sending further comprises:

sending the service data to the consensus nodes that were selected in response to receiving consensus reaching messages sent by the other blockchain nodes.

15. The non-transitory, computer-readable medium of claim 14, wherein the operations further comprise:

in response to determining that a consensus result sent by the consensus nodes that were selected for the service data is received, and in response to determining a need to globally share the consensus result, sending the consensus result for the service data to a consensus node that does not participate in the consensus process in the blockchain network, and storing the consensus result for the service data to a blockchain.

16. The non-transitory, computer-readable medium of claim 14, wherein the operations further comprise:

in response to determining that a consensus result sent by the consensus nodes that were selected for the service data is received, storing the consensus result for the service data to a blockchain in response to determining a need to not globally share the consensus result.

17. A computer-implemented system comprising:

a memory device having tangible, non-transitory, machine-readable media storing one or more instructions; and at least one processor interoperably coupled with the memory device, and configured to execute the one or more instructions to perform operations comprising:

receiving, by a blockchain node of a blockchain network, a request of a service, wherein the request indicates service data, on which to perform the service, wherein the service comprises performance of a consensus process, and wherein the blockchain network comprises a plurality of blockchain nodes;

in response to the request of the service, retrieving, by the blockchain node, the service data from locally stored service data, on which to perform the consensus process;

determining, by the blockchain node, classes of the service based on a service function of the service that was requested or based on a service content of the service that was requested, wherein the service function comprises a function to be performed using the service data and the service content defines an item processed by the service function;

determining, by the blockchain node, one or more service types of the service data corresponding to the classes of the service;

mapping, by the blockchain node, the one or more service types of the service data to one or more consensus algorithms based on a vulnerability of the service data, wherein the vulnerability of the service data indicates whether the service data is vulnerable or invulnerable to an attack;

identifying, by the blockchain node, based on operating principles of the one or more consensus algorithms, a minimum number of consensus nodes to perform the consensus process, wherein the minimum number of consensus nodes comprises a determined percentage of available consensus nodes within the blockchain network designated to process the one or more service types of the service data;

performing, by the blockchain node, a selection of consensus nodes from the blockchain network to perform the consensus process, wherein the selection of consensus nodes is based on the minimum number of consensus nodes and a respective load of each consensus node of consensus nodes in the blockchain network; and sending, by the blockchain node, the service data to the consensus nodes that were selected to perform the consensus process on the service data.

18. The computer-implemented system of claim 17, wherein consensus nodes that were selected comprise a portion of available consensus nodes within the blockchain network that is smaller than the available consensus nodes within the blockchain network for the service data that is invulnerable to the attack.

19. The computer-implemented system of claim 17, wherein performing, by the blockchain node, a selection of consensus nodes comprises:

determining a quantity of consensus nodes to participate in the consensus process of the service data, wherein the quantity of consensus nodes satisfies a predetermined quantity; and selecting, by the blockchain node, a quantity of consensus nodes from the blockchain network.

20. The computer-implemented system of claim 17, wherein the respective load of each consensus node of consensus nodes in the blockchain network is included in a sequence of load statuses.

\* \* \* \* \*